May 19, 1964

R. R. DENMAN ETAL 3,133,807

MOLD COOLING APPARATUS

Filed June 9, 1961

INVENTORS
ROBERT R. DENMAN
EUSTACE H. MUMFORD
BY
ATTORNEYS

May 19, 1964 R. R. DENMAN ETAL 3,133,807
MOLD COOLING APPARATUS
Filed June 9, 1961 2 Sheets-Sheet 2
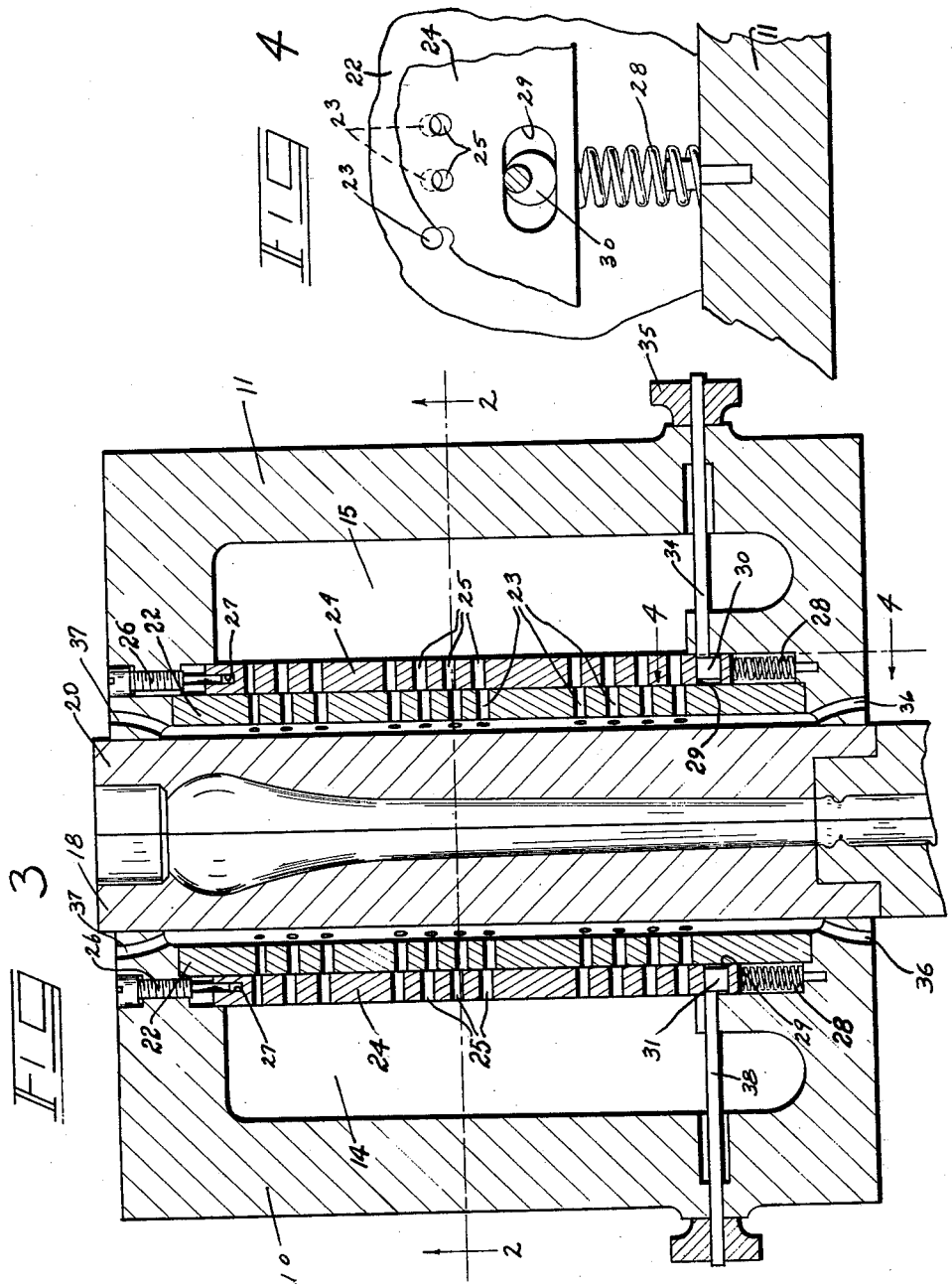
INVENTORS
ROBERT R. DENMAN
EUSTACE H. MUMFORD
BY
ATTORNEYS United States Patent Office 3,133,807
Patented May 19, 1964

3,133,807
MOLD COOLING APPARATUS
Robert R. Denman, Toledo, Ohio, and Eustace H. Mumford, Ottawa Lake, Mich., assignors to Owens-Illinois Glass Company, a corporation of Ohio
Filed June 9, 1961, Ser. No. 116,019
1 Claim. (Cl. 65—356)

This invention relates to apparatus for cooling glass forming molds. More particularly, this invention relates to apparatus for cooling glass forming molds in which the volume of air or other coolant, which impinges on the sides of the molds, may be selectively controlled to thus change the cooling effect on one mold without effecting the volume of coolant which is impinging on other molds.

It has been the practice in the past to direct the coolant air to the molds by way of nozzles spaced around the molds with fixed openings therein facing the exterior surface of the mold. Two examples of the prior art which operate in this manner are U.S. Pats. Nos. 2,688,823 and 2,928,214. With reference to these prior art patents, when it is necessary or desirable to change the cooling effect, it would be necessary to either replace the nozzles with other nozzles having different size or arrangement of openings therein or to change the volume and consequently the pressure of the cooling air being supplied to the nozzles. Thus it can be seen that a serious drawback with respect to controlling the volume of air being utilized for mold cooling is present when it is necessary to change the nozzles or tubes which contain the nozzles when going from one set-up to another.

The second manner of changing the cooling effect in prior art patents involves controlling the volume of air being supplied to the nozzles and this also has its disadvantages. When you are dealing with high velocity air and the orifice openings are appoaching their maximum available opening, a reduction in the volume of air being supplied thereto will reduce the pressure in the chamber behind the fixed orifices or nozzles. This reduction in pressure will result in a change in the cooling pattern being obtained because of the relationship between the pressure and velocity. Furthermore, it is entirely possible that a change in pressure in the chamber will also result in a change in the velocity of air issuing from different sized orifices. This velocity change will not be uniformly reflected in all the orifices thus causing them to become out of balance with respect to each other.

The usual manner of controlling the air flow in these two patents involves the opening or closing of a restriction in the air supply to the plenum or distributing chamber for the various nozzles. However, it should be kept in mind that once the nozzles are fixed in place with respect to the mold halves, it becomes extremely troublesome and difficult to uniformly change the amount of coolant impinging on the external surfaces of the mold halves. Throttling the air supply will result in a cooling air distribution which is non-uniform, circumferentially of the forming molds. In order to maintain uniformity it would then be necessary to remove some of the nozzles and replace them with nozzles having different sized orifices therein.

With this in mind, it can be seen that it would be desirable to have an arrangement wherein the amount of coolant may be effectively changed with respect to a portion of a forming mold without effecting the amount of coolant being supplied to other forming molds or portions thereof.

It is frequently desirable to make changes in the coolant application while the forming machine is in operation. These changes are necessary during the breaking in period of new molds as well as during different periods of the day when humidity and temperature conditions are changing.

As can be seen when viewing the two above-cited prior patents, when a cooling change is desired, it is necessary to actually physically remove the nozzles and replace them with other nozzles. This is true because throttling down of the air supply will not affect all of the nozzles proportionately. With the foregoing in mind;

It is an object of this invention to provide apparatus for cooling parison molds in which the cooling of the molds may be selectively adjusted and controlled on an individual basis without effecting the cooling taking place with respect to other molds.

It is a further object of this invention to provide apparatus for changing the volume of coolant being supplied to one half of a parison mold without affecting the cooling rate of the other half.

It is an additional object of this invention to provide apparatus for adjusting the rate of cooling of parison molds which does not require removing any parts from the mold apparatus, but requires only a slight mechanical adjustment.

Other and further objects and advantages will be apparent from the following description taken in conjunction with the accompanying drawings wherein:

FIG. 3 is a cross-sectional view taken at line 3—3 on FIG. 1, and

FIG. 4 is an enlarged cross-sectional view of the adjusting feature of the invention taken at line 4—4 on FIG. 3.

Figure 1:
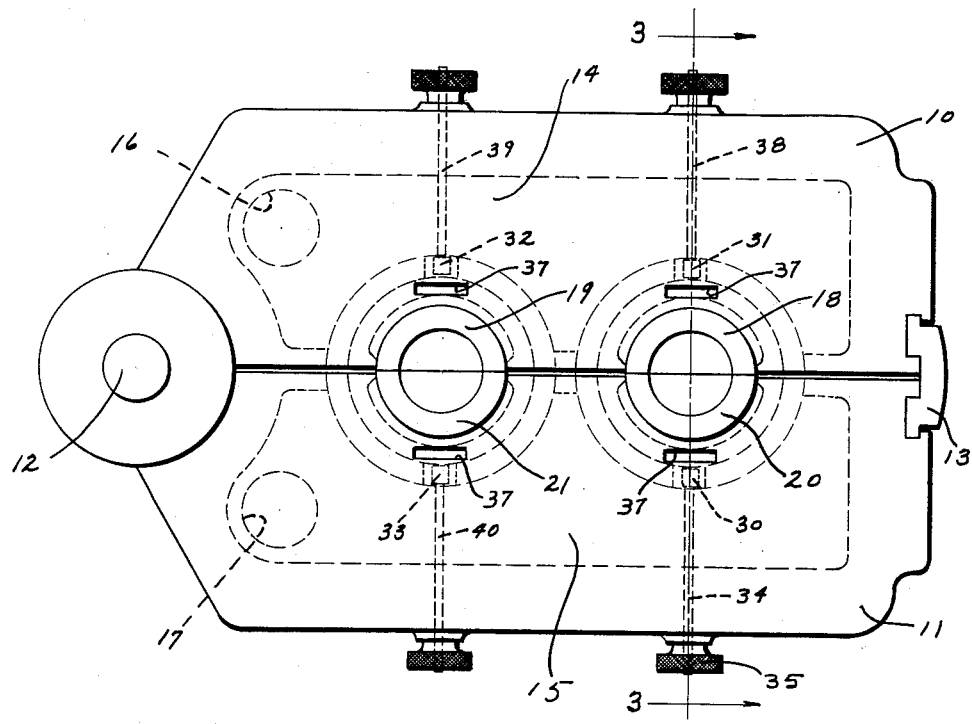
FIG. 1 is a top plan view of a pair of forming molds and their support arms.
Figure 2:
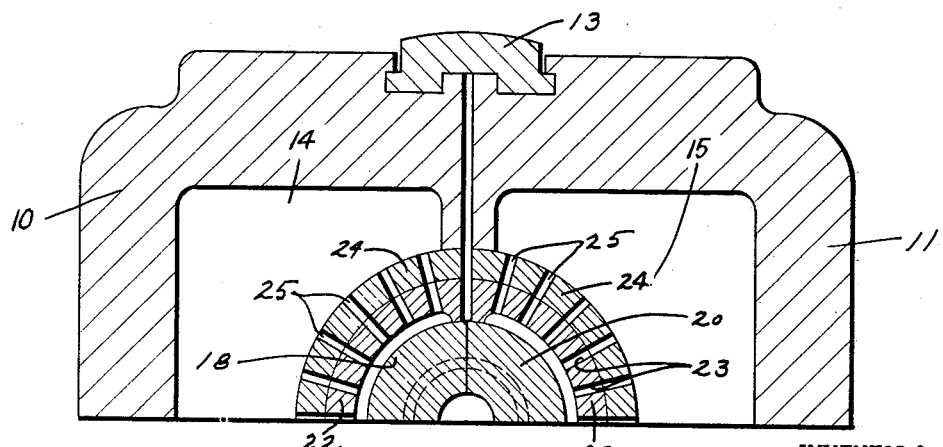
FIG. 2 is a cross-sectional view taken at line 2—2 on FIG. 3.

Referring now to the drawings, a pair of mold arms 10 and 11 are mounted for pivotal movement relative to each other about a vertical axis 12. When the molds are in closed position, as shown in FIG. 1, they are locked together by a mold locking mechanism generally designated 13. The interior of the arms 10 and 11 form plenum chambers 14 and 15 which confine coolant under pressure utilized to cool the forming mold. The cooling air or fluid is fed to the chambers 14 and 15 through a pair of lower openings 16 and 17. The mold arm 10 carries a pair of mold halves 18 and 19 and the mold arm 11 carries complentary mold halves 20 and 21. The exterior surfaces of the mold halves are semi-cylindrical and a semi-cylindrical sleeve 22 fixed within the mold arms is positioned juxtaposed each mold half. The semi-cylindrical sleeves 22 have a plurality of openings 23 formed therethrough in circumferentially surrounding relationship with respect to the mold halves. The openings 23, as best shown in FIG. 3, are formed in vertically spaced groups so as to provide a differential cooling effect to the parison being formed within the mold. The half sleeves 22, which surround the mold halves 18 and 20, form a substantially complete cylindrical member which will surround the external surface of the mold halves 18 and 20 and provide the means of communication between the mold halves 18 and 20 and plenum chambers 14 and 15. As may frequently happen, the two molds on a double cavity machine will run at different temperatures thus requiring greater cooling of one set of mold halves with respect to the other set of mold halves.

To provide an arrangement for adjusting the amount of coolant which will impinge on the external surface of the mold halves, applicants provide a second set of sleeves 24 which are mounted between the plenum chambers 14 and 15 and the first set of sleeves 22. The sleeves 24 have a plurality of openings 25 therethrough having the same pattern and spacing as the openings 23 formed in the sleeves 22. With the sleeves 24 in one position, the openings 25 formed therein would be continuations of the openings 23 formed in the sleeves 22. The sleeves 24 are held in vertical alignment with the openings therein in vertical alignment with the openings formed in the sleeve 22 by means of threaded studs 26 (see FIG. 3) which are threaded through the top of the arms 10 and 11 and have their inner ends extending into complementary slots 27 formed in the top edge of sleeves 24.

The lower end of the sleeves 24 are resiliently biased in an upward direction by means of springs 28 which are compressed between the lower, inner-surface of the mold arms 10 and 11 and the bottom edges of the sleeves 25. Inasmuch as there is clearance at both ends of the sleeve with respect to the mold arms 10 and 11, the sleeves 24 are capable of being vertically shifted with respect to the fixed sleeves 22.

Referring specifically to FIGS. 3 and 4, the arrangement for adjusting the vertical position of the sleeve 24 is shown. Each semi-cylindrical sleeve 24 has a horizontal slot 29 formed therein adjacent the bottom thereof into which cam rollers 30 to 33 are adapted to seat. For example, the roller 30 is eccentrically mounted on one end of a horizontally extending shaft 34 which has its other end extending out through an opening in the mold arm 11. The outer end of the shaft 34 is provided with a knob or handle 35. Thus it can be seen that rotation of the knob 35 will rotate the roller 30 and result in shifting the sleeve 24 with respect to the sleeve 22. In his manner the openings 23 and 25 are displaced relative to each other. When the axes of the openings 23 and 25 are out of alignment, less cooling fluid will pass from the plenum chamber 15 through the openings 23 and 25 and impinge on the surface of the mold half 20 than when the axes of the openings 23 and 25 are coincident. The cooling fluid which passes through the openings and impinges on the surface of the mold half 20 will flow either upward or downward depending on its location with respect to the median height of the mold and be exhausted through either openings 36 or 37 at the bottom and top respectively of the mold arms.

As shown in FIG. 3 the sleeve 24 is shifted vertically a slight amount so that the openings 23 and 25 are not in coaxial alignment. Thus the volume of air which may pass through these openings is less than that which would pass through if the sleeve 24 were adjusted downwardly.

FIG. 4 illustrates the situation in which sleeve 24 has been shifted downward so that the openings 23 and 25 are again out of alignment in the opposite sense. The openings 25 are shown somewhat below the openings 23.

The rollers 31, 32, and 33 are eccentrically mounted on horizontally extending shafts 38, 39, and 40 in the same manner as described with respect to roller 30 and its shaft 34.

With this arrangement, each semi-cylindrical sleeve 24 may be selectively shifted independently of the relative position of the other sleeves and with respect to the complementary fixed sleeves 22. In this manner the cooling effect on each mold half may be adjusted independently of the cooling effect present in the other mold halves and by reason of the fact that the pressure of coolant which is maintained in the plenum chambers 14 and 15 is sufficient for maximum cooling purposes, the shifting of one sleeve 24 with respect to the fixed sleeve 22 will not affect the coolant pressure in the plenum or alter the coolant flow through the other sleeves. Each sleeve 24 is capable of being adjusted merely by rotation of the knobs 35 thus obviating the necessity of dismantling the forming mold structure or replacing parts of the mold cooling mechanism as would be necessary for example, when it is desired to change the cooling effect of the nozzles of the previously cited U.S. Patent Nos. 2,688,823 and 2,928,214.

Thus it can be seen that applicants have provided an arrangement for controlling the amount of coolant being supplied to the forming molds which is both efficient and has great ease of adjustment.

Various modifications may be resorted to within the spirit and scope of the appended claim.

We claim:

Apparatus for controlling the volume of fluid coolant applied to the external walls of a plurality of forming molds without destroying the pattern and relative coolant distribution thereto comprising a pair of complementary mold half supporting arms mounted for movement toward and away from each other, a plurality of split forming molds having outer surfaces that are semi-cylindrical, means carried by each mold supporting arm for mounting a half of each mold with the cavities of said molds being in facing relationship when the arms are in closed position, each arm forming a plenum chamber in surrounding relationship with respect to the outer surface of said mold halves carried thereby, means for introducing cooling fluid into said plenum chambers, a first pair of semi-cylindrical sleeves mounted in each mold arm within the plenum chamber and closely spaced from the outer surface and individual to each mold half, a plurality of circular apertures formed in said first pair of semi-cylindrical sleeves with the axes of said apertures directed radially toward the axis of the mold cavity and being arranged in a predetermined pattern, said sleeves extending throughout substantially the full height of the mold, a second pair of semi-cylindrical sleeves mounted in each mold arm flush with said first pair of sleeves in overlying relationship therewith, a plurality of apertures formed through said second pair of sleeves having the same pattern as the pattern of apertures in said first pair of semi-cylindrical sleeves, said second pair of semi-cylindrical sleeves being of less height than said first pair of sleeves, means formed in said mold arm in contact with said second sleeves for limiting said second sleeves to vertical sliding movement relative to said first sleeves, a horizontal slot formed in each of said second pairs of sleeves adjacent the bottom thereof, a pair of laterally spaced, horizontal shafts extending through each arm with the outer end of each shaft carrying a handle portion, the inner end of each shaft extending into the horizontal slot formed in said second sleeves, a cam fixed to the inner ends of each said shafts and connected eccentrically thereto, said cams being positioned within said horizontal slots, spring means between the mold arm and each of said second sleeves for urging said second sleeve-like members in a vertically upward direction whereby rotation of said shafts in one direction will shift said second pair of sleeve-like members in a vertical direction aided by the force of said springs and rotation of said shafts in the opposite direction will shift said second sleeves in a direction to compress said springs.

References Cited in the file of this patent

UNITED STATES PATENTS

| | | |
|---|---|---|
| 2,402,475 | Waterbury et al. | June 18, 1946 |
| 2,807,992 | Ehman | Oct. 1, 1957 |
| 2,976,795 | Brugler | Mar. 28, 1961 |
| 3,024,571 | Abbott et al. | Mar. 13, 1962 |